(12) United States Patent
Youm

(10) Patent No.: US 6,414,865 B1
(45) Date of Patent: Jul. 2, 2002

(54) AC TO DC CONVERTING APPARATUS

(75) Inventor: Jang-Hyoun Youm, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/965,864

(22) Filed: Oct. 1, 2001

(30) Foreign Application Priority Data

Jul. 6, 2001 (KR) ............................................ 01-40218
Aug. 23, 2001 (KR) ............................................ 01-51072

(51) Int. Cl.$^7$ .............................................. H02M 5/42
(52) U.S. Cl. .......................................... 363/89; 363/80
(58) Field of Search ............................ 363/84, 89, 125, 363/127, 44, 80

(56) References Cited

U.S. PATENT DOCUMENTS

| | | | |
|---|---|---|---|
| 4,688,162 A | * | 8/1987 | Mutoh et al. ............... 323/222 |
| 5,446,647 A | * | 8/1995 | Ikeda et al. ................. 363/127 |
| 6,115,267 A | | 9/2000 | Herbert ........................ 363/25 |
| 6,191,565 B1 | * | 2/2001 | Lee et al. .................... 323/207 |

* cited by examiner

*Primary Examiner*—Edward H. Tso
*Assistant Examiner*—Gary L. Laxton
(74) *Attorney, Agent, or Firm*—Staas & Halsey LLP

(57) ABSTRACT

An AC to DC converting apparatus is disclosed. In the Ac to DC converting apparatus, a first adder adds an output voltage from a rectifying unit to a voltage depending on an output current from the rectifying unit. A current controller outputs a current control signal based on an added result from the first adder. A second adder adds a preset reference voltage to an output voltage from the switching unit. A voltage controller outputs a voltage control signal, and a third adder adds the output voltage from the rectifying unit to a duty reference voltage. A fourth adder adds the voltage control signal to an output voltage from the third adder. A signal limiting unit compares the current control signal with an output signal from the fourth adder, and outputs a compared result as an output signal. A PWM unit generates a PWM signal in response to the output signal from the signal limiting unit.

4 Claims, 4 Drawing Sheets

AC TO DC CONVERTING APPARATUS

BACKGROUND OF THE INVENTION

1. Field of the Invention

The present invention relates in general to DC converting apparatuses, and more particularly to an AC to DC converting apparatus not employing any multiplier for controlling a power factor.

2. Description of the Prior Art

FIG. 1 is a block diagram showing a conventional AC(Alternating Current) to DC(Direct Current) converting apparatus.

Referring to FIG. 1, the conventional AC to DC converting apparatus has a rectifying unit 10, a current sensing unit 30, a first adder 71, voltage controller 20, a multiplier 72, a second adder 73, current controller 40, PWM (Pulse Width Modulation) unit 50, and a switching device 60. The rectifying unit 10 rectifies an AC supply voltage. The current sensing unit 30 senses an output current from the rectifying unit 10, and the first adder 71 adds an output voltage Vdc to a reference voltage for controlling an output voltage Vdc. The voltage controller 20 performs a voltage control operation according to an output signal from the first adder 71. The multiplier 72 multiplies the output voltage from the voltage controller 20 by an output voltage from the rectifying unit 10 after adjusting the level of the voltage by a first level-adjusting unit 11. The second adder 73 adds the output signal from the multiplier 72 to an output signal from the current sensing unit 30 after the level of the signal is adjusted by a second level-adjusting unit 31. The current controller 40 performs a current control operation according to the output signal from the second adder 73. The PWM unit 50 generates a PWM signal in response to the output signal from the current controller 40. The switching device 60 switches the output voltage from the rectifying unit 10 to output the voltage Vdc. The multiplier 72, the second adder 73, the current controller 40, and the PWM unit 60 are integrated into a power factor control IC 80.

The AC to DC converting apparatus having the above construction takes an output voltage from the rectifying unit 10 as a rectified voltage for controlling a power factor. In order to obtain a phase of the rectified voltage, the AC to DC apparatus employs the multiplier 72, such that the multiplier 72 multiplies the output signal from the voltage controller 20 by the output voltage from the rectifying unit 10 after adjusting the level of the output voltage. Then, the current controller 40 generates a current following signal for current control. The second adder 73 adds the current following signal to the sensed output current from the current sensing unit 30 after adjusting the level of the output current, and the added signal is applied to the current controller 40.

Accordingly, the conventional AC to DC converting apparatus is problematic in that its manufacturing costs are increased due to an addition of a multiplier used for obtaining phase information for controlling a power factor. Further, the conventional apparatus controls an output current of a rectifying unit using a sine wave control method for power factor control, such that it has nonlinear characteristics, thus deteriorating its entire operating characteristics.

SUMMARY OF THE INVENTION

Therefore, the present invention has been made in view of the above problem, and it is an object of the present invention to provide an AC to DC converting apparatus, which does not employ any multiplier for controlling a power factor, and compensates for its non-linear components.

In accordance with one aspect of the present invention, the above and other objects can be accomplished by the provision of an AC to DC converting apparatus, comprising a

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
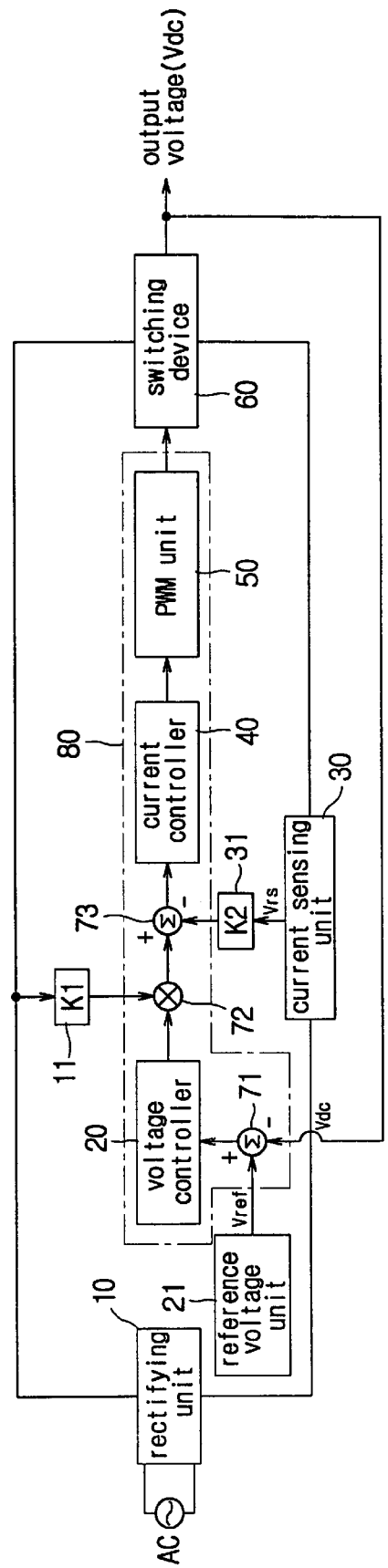
FIG. 1 is a block diagram of a conventional AC to DC converting apparatus.
Figure 2:
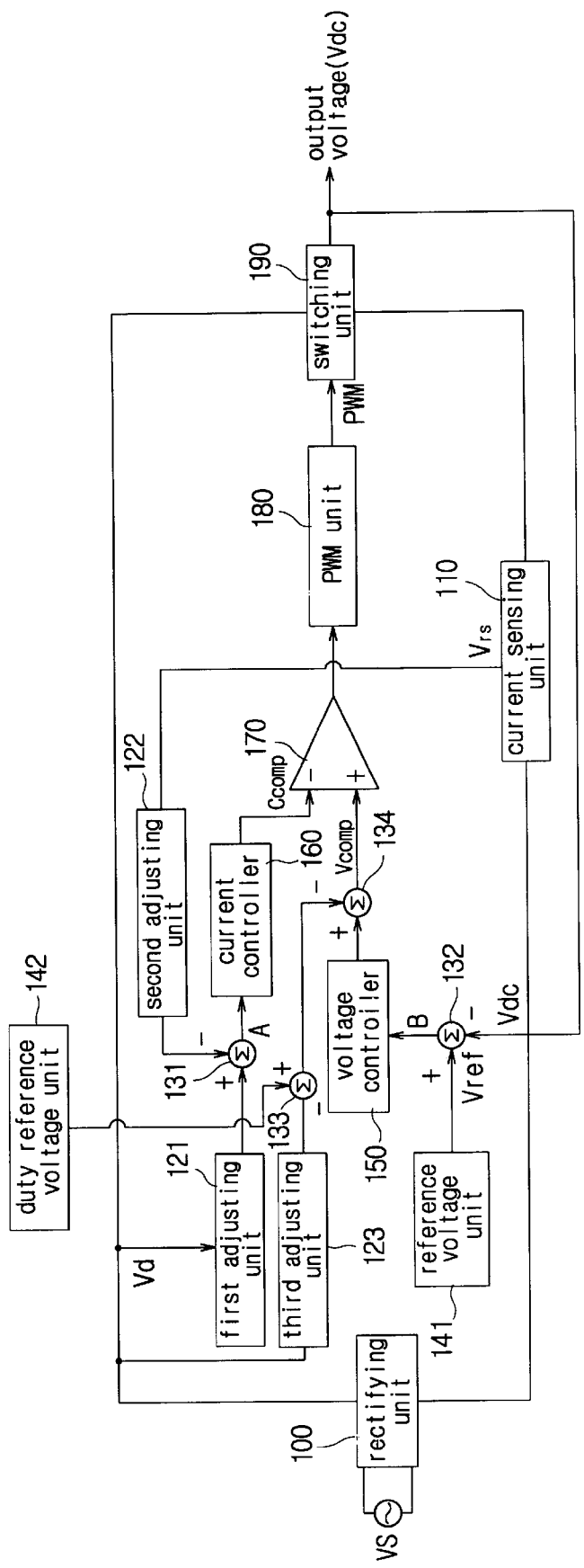
FIG. 2 is a block diagram of an AC to DC converting apparatus according to the preferred embodiment of the present invention.

FIG. 2 is a block diagram of an AC to DC converting apparatus according to the preferred embodiment of the present invention.

Referring to FIG. 2, the AC to DC converting apparatus comprises a rectifying unit 100, a first adjusting unit 121, a current sensing unit 110, a second adjusting unit 122, a first adder 131, and a current controller 160. The rectifying unit 100 full-wave rectifies an AC supply voltage vs. The first adjusting unit 121 adjusts a level of the output voltage from the rectifying unit 100. The current sensing unit 110 detects an output current from the rectifying unit 100, and outputs a detection result as a voltage Vrs. The second adjusting unit 122 adjusts a level of the voltage Vrs from the current sensing unit 110. The first adder 131 adds the output voltage from the first adjusting unit 121 to a negative value of the output voltage from the second adjusting unit 122. The current controller 160 outputs a current control signal Ccomp in response to the output signal from the first adder 131.

Further, the AC to DC converting apparatus comprises a second adder 132, a voltage controller 150, a third adjusting unit 123, a third adder 133, and a fourth adder 134. The second adder 132 adds a negative value of the output voltage Vdc to a reference voltage Vref generated by a reference voltage unit 141. The voltage controller 150 outputs a voltage control signal in response to the output signal from the second adder 132. The third adjusting unit 123 adjusts a level of the output voltage from the rectifying unit 100. The third adder 133 adds a negative value of the output voltage from the third adjusting unit 123 to a duty reference voltage from a duty reference voltage unit 142. The fourth adder 134 adds the voltage control signal from the voltage controller 150 to a negative value of the output voltage from the third adder 133, and outputs an added result as a signal Vcomp.

Further, the AC to DC converting apparatus comprises a signal limiting unit 170, a PWM unit 180, and a switching unit 190. The signal limiting unit 170 receives both the current control signal Ccomp from the current controller 160 and the output signal Vcomp from the fourth adder 134. The PWM unit 180 generates a PWM signal in response to an output signal from the signal limiting unit 170. The switching unit 190 switches the output voltage from the rectifying unit 100 in response to the PWM signal, and outputs the voltage Vdc.

In the above apparatus, the current controller 160, the signal limiting unit 170, and the PWM unit 180 can be integrated into a power factor control IC, and alternatively, can be embodied to separate circuits, respectively.

Figure 3:
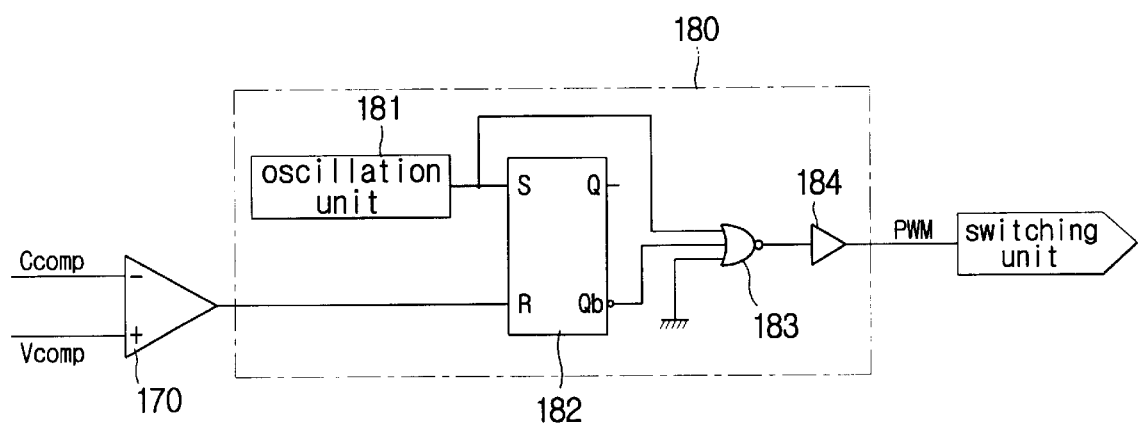
FIG. 3 is a block diagram of a PWM unit included in the apparatus of this invention.

FIG. 3 is a block diagram showing the PWM unit 180 of this apparatus.

Referring to FIG. 3, the PWM unit 180 includes a flip-flop 182, an oscillation unit 181, a NOR gate 183, and a buffer 184. The flip-flop 182 inputs the output signal from the signal limiting unit 170 as a reset signal. The oscillation unit 181 provides a dock signal to the flip-flop 182. The NOR gate 183 inputs an output signal from an inverting output terminal Qb of the flip-flop 182, an output signal from the oscillation unit 181, and a ground voltage, respectively. The buffer 184 buffers an output signal from the NOR gate 183, and outputs a buffered signal to the switching unit 190.

Hereinafter, control variables are described in detail, wherein the control variables are used for rectifying the AC supply voltage, and outputting the rectified voltage as a DC voltage by the AC to DC converting apparatus having the above construction.

First, the AC supply voltage vs is defined as in the following Equation 1, $$vs = Vs \times \sin(2\pi ft) \quad [1]$$

wherein Vs is a magnitude of the voltage vs, and f is a frequency of 50 Hz or 60 Hz.

The rectifying unit 100 full-wave rectifies the AC supply voltage vs. The full-wave rectified voltage from the rectifying unit 100, in other words, the output voltage Vd, is defined as in the following Equation 2.

$$Vd = |vs| = Vs|\sin 2\pi ft| \quad [2]$$

On the other hand, the output voltage Vdc from the switching unit 190 is decided by switching the voltage Vd by the switching unit 190 according to a duty of the PWM signal. Thereby, the relation between the voltage Vdc from the rectifying unit 100 and the output voltage Vd from the switching unit 190 is defined as in the following Equation 3, $$Vdc = \left\{\frac{1}{1-d}\right\} Vd \quad [3]$$

wherein d is the duty of the PWM signal.

Further, the duty "d" used for calculating the output voltage Vdc is calculated by the following Equation 4.

$$d = \left\{1 - \frac{Vd}{Vdc}\right\}, \text{ wherein } Vd = Vs|\sin(2\pi ft)| \quad [4]$$

$$d = \left\{1 - \frac{Vs|\sin(2\pi ft)|}{Vdc}\right\}$$

In Equation 4, the term "Vs|sin 2πft|" is the rectified output voltage Vd from the rectifying unit 100, in which the voltage level of the Vd is adjusted by the third adjusting unit 123, prior to being inputted to the third adder 133 as a negative value. Then, the third adder 133 adds the negative value of output voltage from the third adjusting unit 123 to the duty reference voltage.

Hereinafter, the operation of the AC to DC converting apparatus of this invention is described in detail.

The rectifying unit 100 full-wave rectifies the AC supply voltage vs into the DC voltage, and outputs the rectified voltage Vd. The first and third adjusting units 121 and 123 each adjust the level of the rectified voltage Vd according to a preset ratio. Further, the current sensing unit 110 detects the output current from the rectifying unit 100, and outputs the voltage Vrs based on the detection result. The second adjusting unit 122 adjusts the level of the voltage Vrs from the current sensing unit 110 according to a preset ratio.

The first adder 131 adds the output voltage from the first adjusting unit 121 to the negative value of the output voltage from the second adjusting unit 122, and outputs the added result to the current controller 160.

The second adder 132 adds the reference voltage Vref to the negative value of the output voltage Vdc from the switching unit 190, and outputs the added result to the voltage controller 150. The fourth adder 134 adds the voltage control signal from the voltage controller 150 to the negative value of the output voltage from the third adder 133.

The current control signal Ccomp from the current controller 160 is inputted to an inverting input terminal of the signal limiting unit 170, and the output signal Vcomp from the fourth adder 134 is inputted to a non-inverting input terminal thereof.

Accordingly, the signal limiting unit 170 outputs a logic low signal to the PWM is unit 180 if the level of the signal Ccomp is higher than that of the signal Vcomp. Then, the low signal is applied to the reset terminal of the flip-flop 182, and so the flip-flop 182 outputs a logic high signal through its inverting output terminal Qb. Also, when the output signal from the oscillation unit 181 transits from high to low, the output level at the inverting output terminal Qb of the flip-flop 182 is set to logic low.

According to the above process, the output signal from the oscillation unit 181, the logic low signal from the inverting output terminal Qb of the flip-flop 182, and the ground voltage with a logic low are inputted to the input terminals of the NOR gate 183. The NOR gate 183 outputs a logic high signal only when the output signal from the oscillation unit 181 is in logic high. Here, the high signal from the NOR gate 183 is applied to the switching unit 190 through the buffer 184. In this case, the signal with a level opposite to the signal from the oscillation unit 181 is applied to the switching unit 190, and so the switching unit 190 performs a switching operation while repeating a switching operation in response to the signal applied thereto.

On the other hand, if the level of the output signal Vcomp from the fourth adder 134 is higher than that of the current control signal Ccomp from the current controller 160, the signal limiting unit 170 outputs a logic high signal to the reset terminal R of the flip-flop 182 in the PWM unit 180. When receiving the high signal through a reset terminal R, the flip-flop 182 is reset and outputs a logic low signal through its non-inverting terminal Q, in addition to a logic high signal through its inverting terminal Qb.

Accordingly, the high signal from the inverting terminal Qb is applied to the NOR gate 183, and then the NOR gate 183 outputs a logic low signal, regardless of the output signal from the oscillation unit 181. The low signal from the NOR gate 183 is applied to the switching unit 190 through the buffer 184. In this case, the switching unit 190 is turned off according to the low signal, and the output voltage Vdc is lowered to a ground level. If the output voltage Vdc is lowered to the ground level, the level of the output signal Vcomp from the fourth adder 134 is becomes lower than that of the current control signal Ccomp, thus allowing the signal limiting unit 170 to output a logic low signal to the reset terminal R of the flip-flop 182.

When the output signal from the oscillation unit 181 transits from high to low, the signal level at the inverting output terminal Qb is maintained in logic low, in other words, is set as a logic low signal. Accordingly, the NOR gate 183 outputs a pulse signal varying to high or low, according to the variation of the output signal from the oscillation unit 181. The pulse signal from the NOR gate 183 is applied to the switching unit 190 as a PWM signal through the buffer 184.

Through the above operation of the AC to DC converting apparatus, the output voltage Vdc is maintained constantly.

Figure 4:
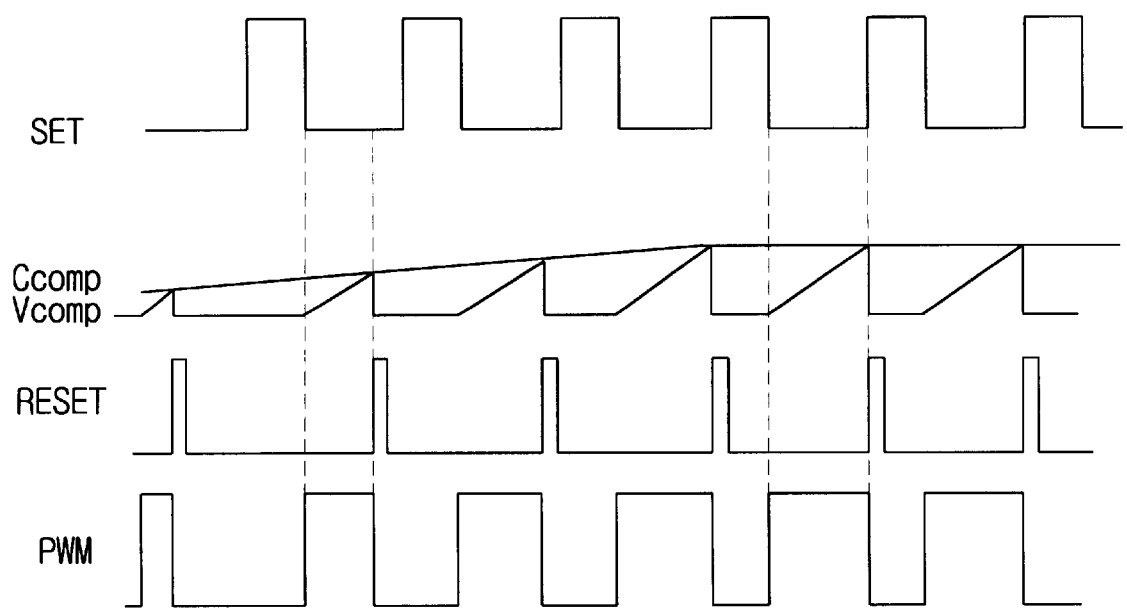
FIG. 4 is a graph showing the operation of the AC to DC converting apparatus of this invention.

FIG. 4 is a graphic diagram showing the operation of the AC to DC converting apparatus of this invention.

Referring to FIG. 4, when the output signal SET from the oscillation unit 181 transits from high to low, the PWM signal transits from logic low to high, thus turning on the switching unit 190. Accordingly, as the output voltage Vdc rises, the signal Vcomp applied to the non-inverting terminal of the signal limiting unit 170 also rises. At this time, the level of the signal Vcomp reaches the level of the current control signal Ccomp, the signal limiting unit 170 outputs a reset signal RESET with a high level to the reset terminal R of the flip-flop 182. Accordingly, the PWM signal from the buffer 184 transits from low to high, and then the switching unit 190 is turned off, thus limiting the output voltage Vdc. According to the above operation, the output voltage Vdc is stabilized while varying the duty ratio of the PWM signal applied to the switching unit 190.

As apparent from the above description, the present invention provides an AC to DC converting apparatus having an advantage that its manufacturing costs are decreased because of not employing any multiplier. Further, the AC to DC converting apparatus of this invention is advantageous in that its elements for controlling the voltage and the current are not serially connected to each other, thus enabling the apparatus to maintain its linear characteristics. Thereby, the apparatus can easily perform an operation of controlling its voltage and current, thus improving its operational reliability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An AC to DC converting apparatus having a rectifying unit for rectifying an AC supply voltage, and a switching unit for switching an output voltage from the rectifying unit, prior to outputting a switched voltage, comprising:

a first adder for adding the output voltage from the rectifying unit to a voltage depending on an output current from the rectifying unit;

a current controller for outputting a current control signal based on an added result from the first adder;

a second adder for adding a preset reference voltage to an output voltage from the switching unit;

a voltage controller for outputting a voltage control signal based on an added result from the second adder;

a third adder for adding the output voltage from the rectifying unit to a duty reference voltage;

a fourth adder for adding the voltage control signal from the voltage controller to an output voltage from the third adder;

a signal limiting unit for comparing the current control signal from the current controller with an output signal from the fourth adder, and outputting a compared result as an output signal; and a PWM unit for generating a PWM signal in response to the output signal from the signal limiting unit, and outputting the PWM signal to the switching unit.

2. The apparatus as set forth in claim 1, further comprising:

a first adjusting unit for adjusting a level of the output voltage from the rectifying unit according to a preset ratio; and a second adjusting unit for adjusting a level of the voltage depending on the output current from the rectifying unit, according to a preset ratio, wherein the first adder adds a level-adjusted signal from the first adjusting unit to a negative value of a level-adjusted signal from the second adjusting unit.

3. The apparatus as set forth in claim 1, further comprising:

a third adjusting unit for adjusting a level of the output voltage from the rectifying unit according to a preset ratio;

a reference voltage unit for generating the preset reference voltage; and a duty reference voltage unit for generating the preset duty reference voltage, wherein the second adder adds the reference voltage from the reference voltage unit to a negative value of the output voltage from the switching unit, and the third adder adds the duty reference voltage from the duty reference voltage to a negative value of an output signal from the third adjusting unit, and the fourth adder adds the voltage control signal to a negative value of an output signal from the third adder.

4. The apparatus as set forth in claim 1, wherein the PWM unit includes:

a flip-flop for inputting the output signal from the signal limiting unit as a reset signal;

an oscillation unit for providing a clock signal to the flip-flop;

a NOR gate for inputting an output signal from an inverting output terminal of the flip-flop, an output signal from the oscillation unit, and a ground voltage; and a buffer for buffering an output signal from the NOR gate, and providing a buffered signal to the switching unit.

* * * * *